(12) United States Patent
Kofuji et al.

(10) Patent No.: US 12,529,155 B2
(45) Date of Patent: Jan. 20, 2026

(54) CARBON DIOXIDE ELECTROLYSIS DEVICE

(71) Applicant: KABUSHIKI KAISHA TOSHIBA, Tokyo (JP)

(72) Inventors: Yusuke Kofuji, Hiratsuka (JP); Akihiko Ono, Kita (JP); Ryota Kitagawa, Setagaya (JP); Satoshi Mikoshiba, Yamato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 731 days.

(21) Appl. No.: 17/652,306

(22) Filed: Feb. 24, 2022

(65) Prior Publication Data
US 2022/0298660 A1  Sep. 22, 2022

(30) Foreign Application Priority Data

Mar. 18, 2021 (JP) .................. 2021-044819

(51) Int. Cl.
*C25B 13/02* (2006.01)
*C25B 1/23* (2021.01)
(Continued)

(52) U.S. Cl.
CPC ............... *C25B 13/02* (2013.01); *C25B 1/23* (2021.01); *C25B 3/26* (2021.01); *C25B 9/19* (2021.01);
(Continued)

(58) Field of Classification Search
CPC .... C25B 1/04; C25B 3/26; C25B 9/19; C25B 9/23; C25B 9/73; C25B 13/02; C25B 13/04; C25B 13/05; C25B 13/07; C25B 13/08
(Continued)

(56) References Cited

U.S. PATENT DOCUMENTS 4,196,070 A   4/1980   Chao et al.
4,388,166 A   6/1983   Suzuki et al.
(Continued)

FOREIGN PATENT DOCUMENTS

CN   1062382 A     7/1992
JP   56-27643 A    3/1981
(Continued)

OTHER PUBLICATIONS

ASTM Method F316 "Standard Test Methods for Pore Size Characteristics of Membrane Filters by Bubble Point and Mean Flow Pore Test" 2019 (Year: 2019).*
(Continued)

*Primary Examiner* — Luan V Van
*Assistant Examiner* — Alexander R. Parent
(74) *Attorney, Agent, or Firm* — Oblon, McClelland, Maier & Neustadt, L.L.P.

(57) ABSTRACT

A carbon dioxide electrolytic device includes an anode configured to oxidize water or a hydroxide ion and thus generate oxygen; an anode solution flow path configured to supply an anode solution to the anode; a cathode configured to reduce carbon dioxide and thus generate a carbon compound; a gas flow path configured to supply a gas to the cathode, the gas containing carbon dioxide; and a diaphragm provided between the anode and the cathode and including a porous film. The porous film includes a first porous surface provided on an anode side and having a first average pore size, and a second porous surface provided on a cathode side and having a second average pore size. The first average pore size is larger than the second average pore size.

13 Claims, 2 Drawing Sheets

(51) Int. Cl.
*C25B 3/26* (2021.01)
*C25B 9/19* (2021.01)
*C25B 9/23* (2021.01)
*C25B 9/60* (2021.01)
*C25B 11/065* (2021.01)

(52) U.S. Cl.
CPC ............... *C25B 9/23* (2021.01); *C25B 9/60* (2021.01); *C25B 11/065* (2021.01)

(58) Field of Classification Search
USPC .................. 204/252, 282, 283, 295, 296
See application file for complete search history.

(56) References Cited

U.S. PATENT DOCUMENTS

| 5,149,403 | A | | 9/1992 | Shimohira et al. |
| 5,183,545 | A | * | 2/1993 | Branca .................. C25B 13/08 204/252 |
| 7,241,367 | B1 | * | 7/2007 | Wang ..................... C25B 13/08 210/500.36 |
| 2003/0113605 | A1 | | 6/2003 | Hidaka et al. |
| 2018/0073155 | A1 | * | 3/2018 | Suzuki ................. C25B 11/057 |
| 2018/0171494 | A1 | * | 6/2018 | Ito ............................ C25B 9/73 |
| 2019/0085470 | A1 | * | 3/2019 | Ono ........................ C25B 13/08 |
| 2020/0181785 | A1 | * | 6/2020 | Mues ...................... C25B 13/08 |
| 2020/0270756 | A1 | | 8/2020 | Kofuji et al. |
| 2022/0298655 | A1 | | 9/2022 | Kofuji et al. |

FOREIGN PATENT DOCUMENTS

| JP | 6-320164 A | 11/1994 |
| JP | 2003-151346 A | 5/2003 |
| JP | 2004-134269 A | 4/2004 |
| JP | 2004-134294 A | 4/2004 |
| JP | 6030952 B2 * | 11/2016 |
| JP | 2020-132965 A | 8/2020 |
| JP | 2022-143970 A | 10/2022 |
| WO | WO 2013/183584 A1 | 12/2013 |
| WO | WO 2020/158719 A1 | 8/2020 |

OTHER PUBLICATIONS

Kang et al. "Preparation of Microporous Chlorinated Poly(Vinyl Chloride) Membrane in Fabric and the Characterization of Their Pore Sizes and Pore-Size Distributions" Journal of Applied Polymer Science, vol. 86, 1195-1202 (2002) (Year: 2002).*

* cited by examiner

CARBON DIOXIDE ELECTROLYSIS DEVICE

CROSS-REFERENCE TO RELATED APPLICATION

This application is based upon and claims the benefit of priority from Japanese Patent Application No. 2021-44819, filed on Mar. 18, 2021; the entire contents of which are incorporated herein by reference.

FIELD

Embodiments described herein relate generally to a carbon dioxide electrolytic device.

BACKGROUND

In recent years, renewable energy such as solar power is desirably converted into not only electrical energy for use but also a storable and transportable resource in terms of both energy and environmental issues. This demand has advanced research and development of artificial photosynthesis technology, which uses sunlight to produce chemical substances like photosynthesis in plants. This technology has potential to store the renewable energy as storable fuel and is also expected to create value by producing chemical substances that can be used as industrial raw materials.

Known examples of a device which uses renewable energy such as sunlight to generate chemical substances, include an electrochemical reaction device which has a cathode and a anode, the cathode being for reducing carbon dioxide ($CO_2$) generated from a carbon dioxide supply source such as a power plant and a refuse disposal plant, and the anode being for oxidizing water ($H_2O$). Examples of the cathode reduce carbon dioxide to generate a carbon compound such as carbon monoxide (CO).

BRIEF DESCRIPTION OF THE DRAWINGS

FIG. 3 is a plan schematic view of a porous surface 130a.

DETAILED DESCRIPTION

A carbon dioxide electrolytic device includes: an anode configured to oxidize water or a hydroxide ion and thus generate oxygen; an anode solution flow path configured to supply an anode solution to the anode; a cathode configured to reduce carbon dioxide and thus generate a carbon compound; a gas flow path configured to supply a gas to the cathode, the gas containing carbon dioxide; and a diaphragm provided between the anode and the cathode and including a porous film. The porous film includes a first porous surface provided on an anode side and having a first average pore size, and a second porous surface provided on a cathode side and having a second average pore size. The first average pore size being larger than the second average pore size.

Hereinafter, embodiments will be described with reference to the drawings. In respective embodiments described below, substantially the same constituent parts are denoted by the same reference signs and description thereof may be partially omitted. The drawings are schematic, and relation of thickness and planar dimension, a thickness ratio among parts, and so on may be different from actual ones.

In this specification, a term "connecting" includes not only direct connecting but also indirect connecting unless otherwise specified.

Figure 1:
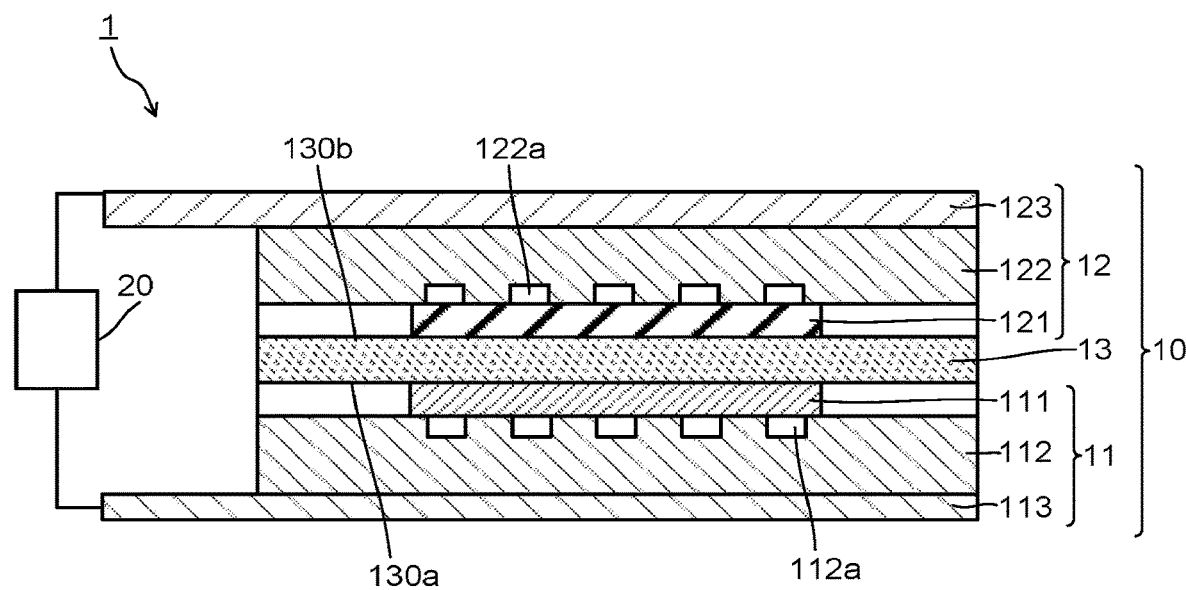
FIG. 1 is a schematic diagram for explaining a configuration example of a carbon dioxide electrolytic device.
Figure 2:
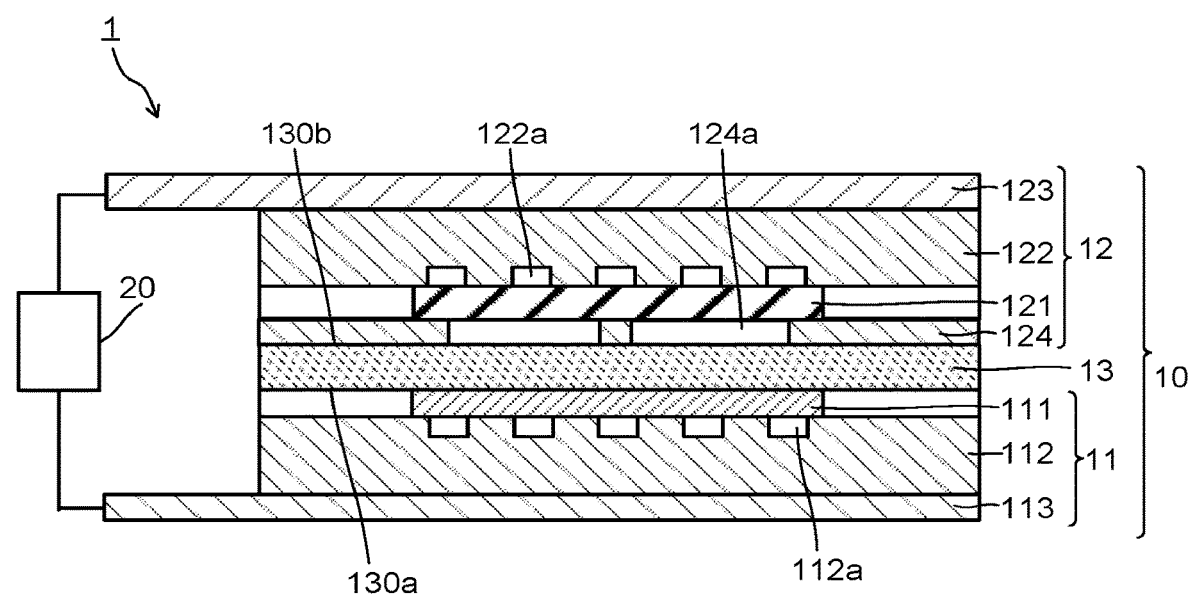
FIG. 2 is a schematic diagram for explaining another configuration example of the device.

FIG. 1 is a schematic diagram for explaining a configuration example of a carbon dioxide electrolytic device. FIG. 2 is a schematic diagram for explaining another configuration example of the device. FIG. 1 and FIG. 2 illustrate a carbon dioxide electrolytic device 1 which has an electrolysis cell 10.

The electrolysis cell 10 includes an anode part 11, a cathode part 12, a diaphragm 13 separating the anode part 11 and the cathode part 12.

The anode part 11 includes an anode 111, an anode solution flow path 112a provided in a flow path plate 112, and an anode current collector 113.

The cathode part 12 includes a cathode 121, a gas flow path 122a provided in a flow path plate 122, and a cathode current collector 123.

The anode 111 is an electrode (oxidation electrode) which promotes an oxidation reaction of water ($H_2O$) in an anode solution to generate oxygen ($O_2$) and hydrogen ions ($H^+$) or promotes an oxidation reaction of hydroxide ions ($OH^-$) generated in the cathode part 12 to generate oxygen and water.

The anode 111 is placed between the diaphragm 13 and the flow path plate 112 in a manner to be in contact with the diaphragm 13 and the flow path plate 112. A first surface of the anode 111 is in contact with the diaphragm 13. A second surface of the anode 111 is provided on a side opposite to the first surface of the anode 111 and faces the anode solution flow path 112a.

A chemical compound generated by the oxidation reaction of the anode 111 varies depending on a type of an oxidation catalyst and other factors. When an electrolytic solution is used as the anode solution, the anode 111 can oxidize water ($H_2O$) to generate oxygen and hydrogen ions, or oxidize hydroxide ions ($OH^-$) to generate water and oxygen, and the anode 111 is preferably mainly constituted by a catalyst material (anode catalyst material) capable of decreasing overvoltage of such a reaction. Examples of such a catalyst material include a metal such as platinum (Pt), palladium (Pd), or nickel (Ni), an alloy or an intermetallic compound which contains such a metal, a binary metal oxide such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), a ruthenium oxide (Ru—O), a lithium oxide (Li—O), or a lanthanum oxide (La—O), a ternary metal oxide such as Ni—Co—O, Ni—Fe—O, La—Co—O, Ni—La—O, or Sr—Fe—O, a quaternary metal oxide such as Pb—Ru—Ir—O or La—Sr—Co—O, and a metal complex such as a Ru complex or a Fe complex.

The anode 111 preferably has a substrate (support) with a structure enabling the anode solution or ions to move between the diaphragm 13 and the anode solution flow path 112a, that is, for example, a porous structure such as a mesh material, a punched material, or a porous member. The substrate with the porous structure includes one with relatively large pores, such as a metal fiber sintered body. The substrate may be constituted by a metal material such as a metal like titanium (Ti), nickel (Ni), or iron (Fe), or an alloy (SUS, for example) which contains at least one of the above metals, or may be constituted by the aforementioned anode catalyst material. When an oxide is used as the anode catalyst material, it is preferable to form a catalyst layer by attaching or laminating the anode catalyst material to a surface of the substrate made of the aforementioned metal material. The anode catalyst material preferably has a form of a nanoparticle, a nanostructure, a nanowire, or the like in order to enhance the oxidation reaction. The nanostructure is a structure obtained by forming nanoscale irregularities on a surface of the catalyst material. Further, the oxidation catalyst is not necessarily required to be provided in the oxidation electrode. An oxidation catalyst layer provided other than in the oxidation electrode may be electrically connected to the oxidation electrode.

The cathode 121 is an electrode (reduction electrode) which causes a reduction reaction of carbon dioxide or a reduction reaction of a reduction product, to generate a carbon compound.

The cathode 121 is preferably constituted by an ion-conductive material, in addition to an electrode substrate and a metal catalyst supported on a carbon material. The ion-conductive material achieves an action of giving and receiving ions between the metal catalysts included in a layer, and has an effect to improve electrode activity.

A cation exchange resin or an anion exchange resin is preferably used as the aforementioned ion-conductive material. Known examples of these resins are polymers with ion modifying groups and include a cationic polymer with a perfluorosulfonic acid group. More specific examples of the resins include the cation exchange resin such as Nafion (registered trademark) manufactured by DuPont or Flemion (registered trademark) manufactured by AGC Inc., and the anion exchange resin such as DIAION (registered trademark) manufactured by Mitsubishi Chemical Corporation or Sustainion (registered trademark) manufactured by Dioxide Materials, Inc.

The support of the metal catalyst preferably has a porous structure. Examples of the usable material include, in addition to the aforementioned materials carbon black such as Ketjen black or Vulcan XC-72, activated carbon, carbon nanotube, and so on. The presence of the porous structure increases an area of an active surface which contributes to an oxidation-reduction reaction to enhance a conversion efficiency.

It is preferable that not only the support but also the catalyst layer itself formed on the substrate has a porous structure, to thereby have many relatively large pores. More specifically, it is preferable that, in a pore size distribution of the catalyst layer as measured by a mercury pressure-injection method, a distribution frequency of pores is maximum in a range of 5 μm or more and 200 μm or less in diameter. In this case, a gas diffuses quickly throughout the catalyst layer and a reduction product is easily discharged out of the catalyst layer through this path, resulting in a highly efficient electrode.

In order to supply carbon dioxide efficiently to the catalyst layer, it is preferable to have a gas diffusion layer in the electrode substrate supporting the catalyst layer. The gas diffusion layer is formed of a conductive porous member. When the gas diffusion layer is formed of a water-repellent porous member, it is possible to decrease an amount of water generated by the reduction reaction or water having moved from an oxidation side and to discharge the water through a reduction flow path, thereby desirably increasing a ratio of a carbon dioxide gas in the porous member.

If a thickness of the gas diffusion layer is extremely small, uniformity across the cell surface is impaired, which is not desirable. On the other hand, if the thickness is extremely large, a material cost increases and the efficiency decreases due to an increase in gas diffusion resistance, which is not desirable. When a denser diffusion layer (mesoporous layer) is provided between the gas diffusion layer and the catalyst layer in order to improve diffusivity, water repellency and porosity are changed, thereby promoting gas diffusion and discharge of a liquid component, which is more desirable.

As the metal catalyst supported on the aforementioned support, a material which decreases activation energy for reducing hydrogen ions or carbon dioxide can be mentioned. In other words, there can be mentioned a metal material which lowers overvoltage at the time of generating a carbon compound by a reduction reaction of carbon dioxide. It is preferable to use, for example, at least one metal selected from the group consisting of gold (Au), silver (Ag), copper (Cu), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), and tin (Sn), a metal oxide thereof, or an alloy containing such a metal. The metal catalyst is not limited to the above but a metal complex such as a ruthenium (Ru) complex or a rhenium (Re) complex, for example, can be used as the reduction catalyst. Further, a plurality of materials may be mixed. It is possible to use various forms of metal catalysts, such as a plate shape, a mesh shape, a wire shape, a particle shape, a porous shape, a thin-film shape, an island shape, and so on. Further, the cathode catalyst material preferably has a shape of a nanoparticle, a nanostructure, a nanowire, or the like, in order to enhance the oxidation reaction.

When the metal nanoparticle is used for the metal catalyst, an average diameter thereof is preferably 1 nm or more and 15 nm or less, more preferably 1 nm or more and 10 nm or less, and further preferably 1 nm or more and 5 nm or less. When this condition is satisfied, a surface area of metal per catalyst weight becomes large to thereby bring about high activity by a small amount of metal, which is desirable.

The chemical compound generated by the reduction reaction varies depending on a type of the metal catalyst functioning as the reduction catalyst or other factors. The chemical compound generated by the reduction reaction is a carbon compound such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), or ethylene glycol, for example, or hydrogen.

The anode 111 and the cathode 121 can be connected to the power supply 20. Examples of the power supply 20 are not limited to an ordinary system power supply or a battery, but may include a power supply which supplies electric power generated by renewable energy such as solar cell or wind power. The power supply 20 may further have a power controller which adjusts an output of the aforementioned power supply to thereby control voltage between the anode 111 and the cathode 121. The power supply 20 may be provided outside the device 1.

The anode solution flow path 112a has a function to supply the anode solution to the anode 111. The anode solution flow path 112a is constituted by a pit (groove/recess) provided in the flow path plate 112. The flow path plate 112 has an inlet port and an outlet port (both not illustrated) connected to the anode solution flow path 112a, and the anode solution is introduced and discharged by a pump (not illustrated) via these inlet port and outlet port. The anode solution flows within the anode solution flow path 112a in a manner to be in contact with the anode 111.

The gas flow path 122a faces a first surface of the cathode 121. The gas flow path 122a has a function to supply a gas which includes carbon dioxide to the cathode 121. The gas flow path 122a can be connected to a carbon dioxide supply source which supplies the gas that includes carbon dioxide, for example. A facility such as a power plant or a refuse disposal plant, for example, can be mentioned as the carbon dioxide supply source. The gas flow path 122a is constituted by a pit (groove/recess) provided in the flow path plate 122. The flow path plate 122 has an inlet port and an outlet port (both not illustrated) connected to the gas flow path 122a, and the aforementioned gas is introduced and discharged by a pump (not illustrated) via these inlet port and outlet port.

Materials used for the flow path plate 112 and the flow path plate 122 are preferable to be materials with low chemical reactivity and high conductivity. Examples of such materials include, for example, a metal material such as Ti or SUS, carbon, and so on. That the flow path plate 112 and the flow path plate 122 have an inflow port and an outflow port for each flow path or a screw hole for fastening, which are not illustrated. Further, not-illustrated packings are sandwiched between the front and the back of each flow path plate as necessary.

The flow path plate 122 can have a land which is in contact with the cathode 121 for electrical connection with the cathode 121. As a shape of the gas flow path 122a, there can be mentioned shapes such as a shape adjacent to a columnar land and a serpentine shape obtained by bending a long flow path, but the shape is not limited in particular as long as it has a cavity. When the gas flow path 122a is constituted by a plurality of flow paths connected in parallel or a serpentine flow path, or a combination thereof, uniformity of the gas supplied to the cathode 121 can be enhanced to thereby enhance uniformity of electrolytic reactions, which is desirable.

A depth of the gas flow path 122a is preferably small in view of supply of carbon dioxide to the gas diffusion layer and discharge of a liquid, and in view of performing uniform reactions on the cell surface. However, a narrow flow path increases flow path pressure drop, thereby causing energy loss of gas supply or letting the gas pass not through the flow path but through the diffusion layer to hamper the uniform reactions on the cell surface, so that an extremely narrow gas flow path is not preferable.

A carbon dioxide concentration in the gas supplied to the gas flow path 122a is not required to be 100%. In this case, it is also possible to reduce a gas which includes carbon dioxide discharged from various facilities, though an efficiency may be decreased.

A carbon dioxide electrolytic device illustrated 1 in FIG. 2 is different from the device 1 illustrated in FIG. 1 in that the device 1 illustrated in FIG. 2 further has a cathode solution flow path 124a provided in a flow path plate 124. The flow path plate 124 is provided in a cathode part 12. The cathode solution flow path 124a is provided between a cathode 121 and a diaphragm 13 and faces on a second surface on a side opposite to the aforementioned first surface of the cathode 121. The cathode solution flow path 124a has a function to supply a cathode solution to the cathode 121. The cathode solution flow path 124a is constituted by a pit (groove/recess) provided in the flow path plate 124. The flow path plate 124 may be formed by using a material usable for a flow path plate 112 or a flow path plate 122, for example.

An aqueous solution containing arbitrary electrolyte can be used as the anode solution and the cathode solution. Examples of the aqueous solution containing electrolyte include an aqueous solution containing at least one ion such as a phosphate ion ($PO_4^{2-}$), a borate ion ($BO_3^{3-}$), a sodium ion ($Na^+$), a potassium ion ($K^+$), a calcium ion ($Ca^{2+}$), a lithium ion ($Li^+$), a cesium ion ($Cs^+$), a magnesium ion ($Mg^{2+}$), a chloride ion ($Cl^-$), a hydrogen carbonate ion ($HCO_3^-$), or a carbonate ion ($CO_3^{2-}$). In addition to the above, it is possible to use an aqueous solution containing $LiHCO_3$, $NaHCO_3$, $KHCO_3$, $CsHCO_3$, phosphoric acid, boric acid, or the like.

Examples of the cathode solution may include an ionic liquid which consists of a salt of a cation such as an imidazolium ion or a pyridinium ion and an anion such as $BF_4^-$ or $PF_6^-$ and is in a liquid state in a broad temperature range, or an aqueous solution thereof. As other cathode solutions, there can be mentioned an amine such as ethanolamine, imidazole, or pyridine, or an aqueous solution thereof. The amine may be any one of a primary amine, a secondary amine, and a tertiary amine.

The anode current collector 113 is provided on a surface of the flow path plate 112 on a side opposite to the contact surface to an anode 111. The anode current collector 113 is electrically connected to the anode 111. The anode current collector 113 preferably contains a material with low chemical reactivity and high electrical conductivity. A metal material such as Ti or SUS, carbon, and so on can be mentioned as such materials.

The cathode current collector 123 is provided on a surface of the flow path plate 122 on a side opposite to the contact surface to the cathode 121. The cathode current collector 123 is electrically connected to the cathode 121. The cathode current collector 123 preferably contains a material with low chemical reactivity and high electrical conductivity. A metal material such as Ti or SUS, carbon, and so on can be mentioned as such materials.

The diaphragm 13 is provided between the anode 111 and the cathode 121. The diaphragm 13 includes a porous film with nonuniform pore sizes. The diaphragm 13 has a porous surface 130a and a porous surface 130b. In a structure illustrated in FIG. 2, the cathode solution flows through the cathode solution flow path 124a in a manner to be provided on the cathode 121 and the porous surface 130b.

Examples of the material of the porous film include at least one of inorganic materials such as a metal oxide, a metal hydroxide, a metal nitrate, a metal sulfate, ceramics, and glass, and organic materials such as polytetrafluoroethylene, polychlorotrifluoroethylene, polyetheretherketone, polyethylene, polyethylene terephthalate, polybutylene terephthalate, cellulose acetate, nitrocellulose, polyphenylsulfone, polyphenylene sulfide, polysulfone, polyethersulfone, polyacrylonitrile, polyetherimide, polyamideimide, polyvinylidene fluoride, polycarbonate, polyester, polybenzimidazole, polyarylate, acrylic, nylon, polyolefin, polyurethane, polypropylene, and polystyrene. Among the above, it is preferable to include a hydrophilic material, i.e., the metal oxide, the metal hydroxide, the metal nitrate, the metal sulfate, ceramics, glass, cellulose acetate, nitrocellulose, polyethersulfone, nylon, or polyester. Further, the aforementioned hydrophilic material and the aforementioned hydrophobic materials may be combined and used as the material for the diaphragm 13. In this case, by granting hydrophilicity to the stable hydrophobic material, a diaphragm for a carbon dioxide electrolytic device withstanding long-term operation can be realized, which is desirable. A contact angle with water in the hydrophobic material is, for example, 100 degrees or more and less than 180 degrees. Further, a contact angle with water in the hydrophilic material is, for example, over 0 degree and less than 90 degrees.

Figure 3:
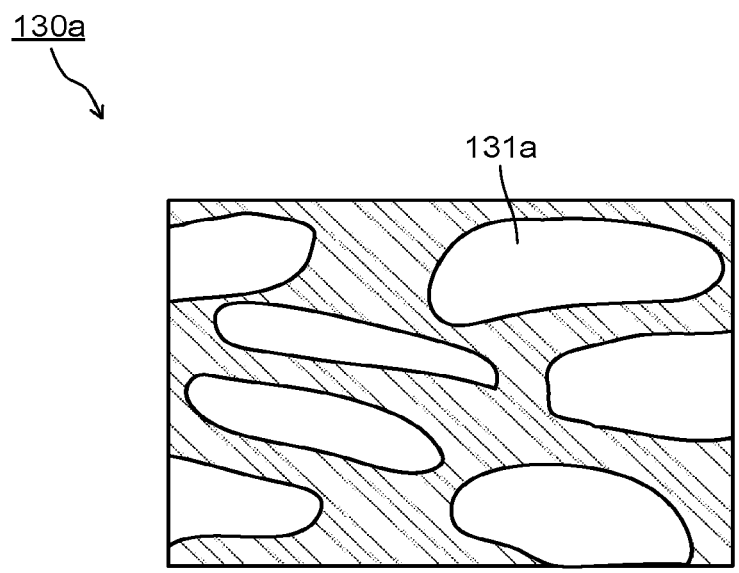

The porous surface 130a is provided on the anode 111 side. FIG. 3 is a plan schematic view of the porous surface 130a. The porous surface 130a has a plurality of pores 131a.

The porous surface 130a has a first average pore size. In FIG. 1, the porous surface 130a is provided on the anode 111.

Figure 4:
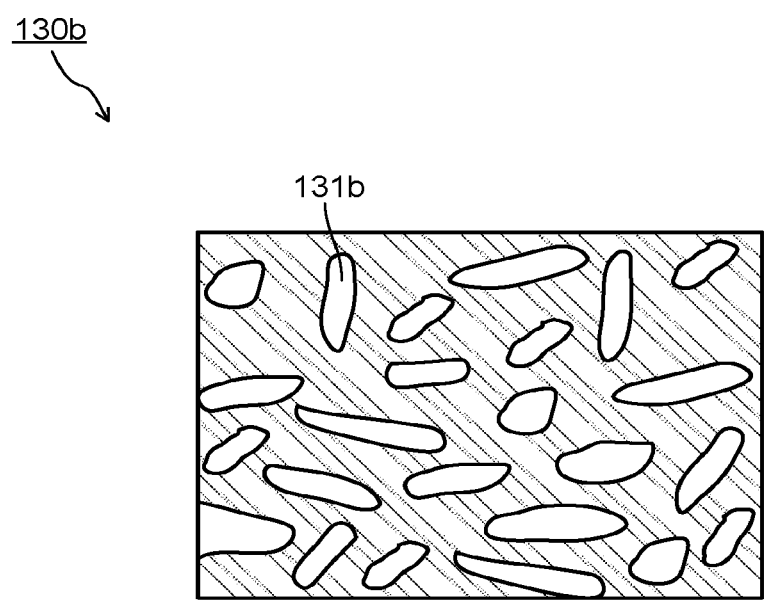
FIG. 4 is a plan schematic view of a porous surface 130b.

The porous surface 130b is provided on the cathode 121 side. FIG. 4 is a plan schematic view of the porous surface 130b. The porous surface 130b has a plurality of pores 131b. The porous surface 130b has a second average pore size. In FIG. 1, the porous surface 130b is provided on the cathode 121.

The average pore size (first average pore size) of the porous surface 130a is preferably larger than the average pore size (second average pore size) of the porous surface 130b. An increase of the first average pore size enables easier forming of a liquid film within the porous film, so that migration of a gas from the cathode 121 side can be prevented. Therefore, a gas barrier property can be enhanced, to be able to improve reduction selectivity of carbon dioxide.

The average pore size (second average pore size) of the porous surface 130b is preferably smaller than the average pore size (first average pore size) of the porous surface 130a. Making the second average pore size small can prevent migration of an electrolytic solution from the anode 111 side. Therefore, progress of a side reaction is prevented, to be able to improve reduction selectivity of carbon dioxide.

Since a detailed analysis of distribution of pore sizes in a thickness direction of the porous film is difficult, a large pore size side and a fine pore size side are determined by measuring respective average pore sizes of the porous surface 130a and the porous surface 130b, which are uppermost surfaces.

The average pore size of the uppermost surface is specifically calculated by a scanning electron microscope (SEM) and a measurement device accompanying the SEM and using pore analysis software. As the measurement device, for example, Phenom Pro manufactured by JASCO International Co., Ltd. and PoroMetric software accompanying Phenom Pro are used. As an example of measurement parameters, measurement magnification: 8000 times, min contrast: 0.5, merge shared borders: 0.3, exclude edge pores: on, conductance: 0.3, and min detection size: 1.0 can be mentioned.

The average pore size (first average pore size) of the porous surface 130a is preferably 1.02 or more times the average pore size (second average pore size) of the porous surface 130b, more preferably 1.05 or more times, and further preferably 1.1 or more times. When the average pore size of the first surface is less than 1.02 times the second average pore size, a liquid film is hard to be formed within the porous film, making it sometimes impossible to prevent migration of the gas. An upper limit is not limited in particular but is 100 times, for example.

The first average pore size is preferably 1 nm or more and 50 μm or less, more preferably 1 nm or more and 30 μm or less, and further preferably 1 nm or more and 10 μm or less. When the first average pore size is less than 1 nm, migration of the electrolytic solution and ions is inhibited and cell voltage increases, which is not desirable. On the other hand, when the first average pore size exceeds 50 μm, the electrolytic solution moves from the anode 111 side to the cathode 121 side and the cathode 121 is filled with a liquid such as water, leading to predominance of hydrogen generation being a side reaction, which is not desirable.

The second average pore size is preferably 1 nm or more and 500 nm or less, more preferably 1 nm or more and 300 nm or less, and further preferably 1 nm or more and 100 nm or less. When the second average pore size is less than 1 nm, migration of the electrolytic solution and ions is inhibited and cell voltage increases, which is not desirable. On the other hand, when the second average pore size exceeds 500 nm, the electrolytic solution moves from the anode 111 side to the cathode 121 side and the cathode 121 is filled with water, leading to predominance of hydrogen generation being the side reaction, which is not desirable.

A thickness of the diaphragm 13 is preferably 5 μm or more and 500 μm or less, more preferably 10 μm or more and 400 μm or less, and further preferably 20 μm or more and 300 μm or less. When the thickness is less than 5 μm, mechanical strength decreases, thereby causing problems during long-term operation. On the other hand, when the thickness exceeds 500 μm, migration of the electrolytic solution and ions is inhibited and cell voltage increases, which is not desirable.

Next, an operation example of the device of the embodiment will be described. Here, there is mainly described a case where the device 1 illustrated in FIG. 1 generates carbon monoxide as the carbon compound, but the carbon compound as the reduction product of carbon dioxide is not limited to carbon monoxide. The carbon compound may be methane, formic acid, ethane, ethylene, methanol, ethanol, ethylene glycol, or the like as described above, and it is possible to further reduce carbon monoxide being the reduction product to generate the organic compound mentioned above. When a carbon compound in a solution state is to be generated, it is preferable to use the electrolysis cell 10. Further, a reaction process by the electrolysis cell 10 is considered to be generating mainly hydrogen ions ($H^+$) or generating mainly hydroxide ions ($OH^-$), but is not limited to either of the above reaction processes.

The reaction process of mainly oxidizing water ($H_2O$) to generate hydrogen ions will be described. When an electric current is supplied between the anode 111 and the cathode 121 from the power supply 20, an oxidation reaction of water ($H_2O$) occurs in the anode 111 in contact with the anode solution. More specifically, as indicated by a formula (1) below, $H_2O$ contained in the anode solution is oxidized to generate oxygen ($O_2$) and hydrogen ions ($H^+$).

$$2H_2O \rightarrow 4H^+ + O_2 + 4e^- \qquad (1)$$

The $H^+$ generated in the anode 111 moves in the electrolytic solution existing in the anode 111, and the diaphragm 13, to reach a vicinity of the cathode 121. A reduction reaction of carbon dioxide ($CO_2$) is caused by electrons ($e^-$) based on the electric current supplied from the power supply 20 to the cathode 121 and the $H^+$ having moved to the vicinity of the cathode 121. More specifically, as indicated by a formula (2) below, carbon dioxide supplied from the gas flow path 122a to the cathode 121 is reduced to generate carbon monoxide. Further, as indicated by a formula (3) below, the hydrogen ions receive the electrons to thereby generate hydrogen. At this time, hydrogen may be generated simultaneously with carbon monoxide.

$$CO_2 + 2H^+ + 2e^- \rightarrow CO + H_2O \qquad (2)$$

$$2H^+ + 2e^- \rightarrow H_2 \qquad (3)$$

Next, the reaction process of mainly reducing carbon dioxide ($CO_2$) to generate hydroxide ions (OH) will be described. When an electric current is supplied between the anode 111 and the cathode 121 from the power supply 20, water ($H_2O$) and carbon dioxide ($CO_2$) are reduced in the vicinity of the cathode 121 to generate carbon monoxide (CO) and hydroxide ions (OH), as indicated by a formula (4) below. Further, as indicated by a formula (5) below, water receives electrons to thereby generate hydrogen. At this time, hydrogen may be generated simultaneously with carbon monoxide. The hydroxide ions (OH⁻) generated by the above reactions diffuse in a vicinity of the anode 111, and the hydroxide ions (OH⁻) are oxidized to generate oxygen ($O_2$), as indicated by a formula (6) below.

$$2CO_2 + 2H_2O + 4e^- \rightarrow 2CO + 4OH^- \quad (4)$$

$$2H_2O + 2e^- \rightarrow H_2 + 2OH^- \quad (5)$$

$$4OH^- \rightarrow 2H_2O + O_2 + 4e^- \quad (6)$$

In the electrolysis cell 10 illustrated in FIG. 1, the anode solution and ions are supplied from the diaphragm 13 and the carbon dioxide gas is supplied from the gas flow path 122a. On the other hand, in the cathode of the electrolysis cell 10 illustrated in FIG. 2, the cathode solution and ions are supplied from the cathode solution flow path 124a and the carbon dioxide gas is supplied from the gas flow path 122a. The reduction product in a gas state is mainly discharged from the gas flow path 122a, and a product in a liquid state is mainly discharged from the cathode solution flow path 124a.

In the device 1, the flow path (gas flow path 122a) on the cathode 121 side may be operated under a positive pressure relative to the flow path (anode solution flow path 112a) on the anode 111 side. A pressure difference between the flow path on the cathode 121 side and the flow path on the anode 111 side is preferably 5 kPa or more and 800 kPa or less, more preferably 10 kPa or more and 500 kPa or less, and further preferably 20 kPa or more and 300 kPa or less. The pressure difference of 5 kPa or more prevents excessive migration of the electrolytic solution to the 121 side and prevents hydrogen generation being a side reaction, which is desirable. On the other hand, the pressure difference of 800 kPa or more leads to easier occurrence of crossover in which a gas on a cathode side moves to an anode side, which is not desirable. There are no restrictions on where to measure flow path pressures, and measurement is performed, for example, at inlets of the gas flow path and the anode solution flow path.

The device 1 is not only specialized in the reduction of carbon dioxide, but can also produce a carbon dioxide reduced substance and hydrogen at an arbitrary ratio, that is, for example, can generate carbon monoxide and hydrogen at a ratio of 1:2 to produce methanol in a subsequent chemical reaction.

Since hydrogen is an inexpensive and readily available raw material from water electrolysis or fossil fuel, it is not necessary to have a large ratio of hydrogen. From such a viewpoint, it is preferable that a ratio of carbon monoxide to hydrogen is at least one or more, more preferably 1.5 or more, considering economic efficiency or environmental friendliness.

As described above, in the device of the embodiment, the diaphragm is placed in a manner that the porous surface in which the pore size is large is disposed on the anode side and that the porous surface in which the pore size is fine is disposed on the cathode side.

When configuring a carbon dioxide electrolytic device, it is effective to realize a configuration in a mode similar to that of a fuel cell such as a polymer electric fuel cell (PEFC), for example. More specifically, by directly supplying carbon dioxide to a catalyst layer of a cathode, a carbon dioxide reduction reaction can proceed quickly.

In such a mode, selection of a diaphragm separating the cathode and an anode is important. The diaphragm is required to have a high gas barrier property in order to prevent mixing (crossover) of a gas (for example, oxygen) generated in an anode part and a gas (for example, carbon monoxide) generated in a cathode part. Further, in the device as above, a medium carrying electricity (electron) is an ion, and a high ion permeability is required of the diaphragm for the sake of efficient progress of the reaction.

In the PEFC, a stable film made of a cation exchange resin, such as Nafion (registered trademark) manufactured by Dupont or Fremyon (registered trademark) manufactured by AGC Inc., for example, is used. When such a film is used for a diaphragm of a carbon dioxide electrolytic device, generation of hydrogen being a side reaction becomes dominant and a reaction efficiency decreases. On the other hand, when an anion exchange resin such as Sustenion (registered trademark) manufactured by Dioxide Materials, Inc. is used, hydrogen generation is prevented, but at present such a film has poor thermal and mechanical stability and has a problem in durability.

One of methods to solve the aforementioned problems which occur when using the ion exchange film is to use a porous film without ion permeation selectivity for a diaphragm. In this method, ions permeate through the diaphragm by direct migration of an electrolytic solution. This method has been studied also in alkaline water electrolysis or the like, and a method to supply a stable diaphragm is proposed.

However, if the same diaphragm as that of a water electrolytic device is used for a diaphragm of a carbon dioxide electrolytic device, a special problem occurs which is different from a problem of water electrolysis. The aforementioned diaphragm for water electrolysis has a comparatively large pore size in order to ensure sufficient permeability of the electrolytic solution. In this case, since the electrolytic solution is likely to soak into the diaphragm, a liquid film is formed within the diaphragm to thereby realize a sufficient gas barrier property. However, if the diaphragm with the large pore size as above is used for the device, a cathode surface is flooded with the electrolytic solution and hydrogen generation being a side reaction progresses, resulting in a gradual decrease in efficiency. On the other hand, if a diaphragm with a small pore size is used in order to prevent the above, the electrolytic solution is hard to soak into the diaphragm, resulting in a decrease in gas barrier property.

In the device of the embodiment, by using the porous film with two porous surfaces of different average pore sizes for the diaphragm, the gas barrier property is ensured and progress of the side reaction is prevented, so that the decrease in electrolysis efficiency can be prevented even during long-term operation.

In the device of the embodiment, the side facing the anode 111 of the diaphragm 13 is a region where the electrolytic solution is likely to soak due to the large pore size, so that the liquid film is formed in that region to thereby ensure the gas barrier property. On the other hand, in a region facing the cathode 121, the small pore size prevents excessive migration of the electrolytic solution, so that progress of the side reaction is prevented. Thereby, crossover is prevented and it becomes possible to maintain the high electrolysis efficiency for a long time.

In a case where a porous film with a uniform pore size is used, if the pore size is small, an electrolytic solution is not likely to soak into the porous film and a liquid film is hard to be formed, so that a gas barrier property decreases to thereby cause crossover. On the other hand, if the pore size is increased, the gas barrier property is improved, but a large amount of electrolytic solution on an anode side permeates into a cathode side, causing a cathode surface to be flooded with water to thereby progress a reduction reaction of water and inhibit a reduction reaction of carbon dioxide, resulting in a decrease in electrolysis efficiency.

EXAMPLES

Example 1

A carbon dioxide electrolytic device illustrated in FIG. 1 was fabricated according to the following procedure.

A cathode catalyst layer was fabricated by using spray coating. For an electrode substrate, carbon paper with a diffusion layer which has a microporous layer was used. In performing spray coating, a coating solution in which a metal catalyst, pure water, isopropanol, and a Nafion solution are mixed at a predetermined ratio was sprayed onto the carbon paper. From the resultant, a 4×4 cm portion was cut out to obtain a cathode (electrode area: 16 cm$^2$).

For an anode, an electrode coated with $IrO_2$ nanoparticles as a catalyst on a Ti mesh was used. From the $IrO_2$/Ti mesh, a 4×4 cm portion was cut out to obtain the anode.

An electrolysis cell was fabricated by laminating a cathode current collector, a gas flow path, the cathode, a diaphragm, the anode, an electrolytic solution flow path, and an anode current collector in order from the top, sandwiching the laminate by an unillustrated support plate, and further, fastening the above by a bolt. Further, the anode current collector and the cathode current collector were connected to an external power supply, whereby the electrolytic device illustrated in FIG. 1 was fabricated.

For the diaphragm, a polyethersulfone film (nominal pore size: 0.03 μm, nominal thickness: 110 to 150 μm, manufactured by GVS Japan K.K.) was used. In this case, the film was disposed in a manner that a porous surface (belt side) with a large pore size is in contact with the anode and that a porous surface (air side) with a fine pore size is in contact with the cathode.

The aforementioned electrolytic device was operated under following conditions. A predetermined amount of carbon dioxide was supplied to the gas flow path and a sodium hydrogen carbonate aqueous solution (concentration: 0.1 M) was made to flow in the electrolytic solution flow path. A constant current of 400 mAcm$^{-2}$ was continuously applied between the anode and the cathode. Further, a gas generated from the cathode side was collected every 10 minutes and quantified by gas chromatography to calculate a CO generation Faraday's efficiency and an $H_2$ generation Faraday's efficiency. The CO generation Faraday's efficiency by this cell was 95% and the $H_2$ generation Faraday's efficiency by this cell was 5% after the start of electrolysis. A total of the Faraday's efficiencies was 100%. This efficiency was maintained for 50 hours with no change in value.

Comparative Example 1

The same diaphragm as in Example 1 was used, a porous surface (belt side) with the large pore size being disposed on a cathode and a porous surface (air side) with the fine pore size being disposed on an anode, and other than that, a cell was assembled in the same way as in Example 1 and evaluation was performed in the same way as in Example 1. In this case, a CO generation Faraday's efficiency was 95% and an $H_2$ generation Faraday's efficiency was 5% after the start of electrolysis. However, a total of the Faraday's efficiencies decreased to be about 92% after operation of 50 hours. This is a phenomenon due to gas crossover and it is considered to be caused by migration of CO or $H_2$ generated on the cathode side to the anode side. These results show that by disposing a film with non-uniform pore sizes in a predetermined orientation, it is possible to realize a cell with both gas barrier property and reduction selectivity of carbon dioxide.

The configurations of the aforementioned respective embodiments can be mutually combined to be carried out, and a part thereof can be substituted. Here, while certain embodiments of the present invention have been described, these embodiments have been presented by way of example only, and are not intended to limit the scope of the inventions. The embodiments described herein may be embodied in a variety of other forms, furthermore, various omissions, substitutions, changes, and so on may be made therein without departing from the spirit of the inventions. The accompanying claims and their equivalents are intended to cover such forms or modifications as would fall within the scope and spirit of the inventions.

What is claimed is:

1. A carbon dioxide electrolytic device comprising:
   an anode configured to oxidize water or a hydroxide ion and thus generate oxygen;
   an anode solution flow path configured to supply an anode solution to the anode;
   a cathode configured to reduce carbon dioxide and thus generate a carbon compound;
   a gas flow path configured to supply a gas to the cathode, the gas containing carbon dioxide; and
   a diaphragm provided between the anode and the cathode and including a porous film, wherein
   the porous film includes
      a first porous surface provided on an anode side and having a first average pore size, and
      a second porous surface provided on a cathode side and having a second average pore size,
   the first average pore size is 1.1 or more times the second average pore size,
   the first average pore size is 1 nm or more and 50 μm or less, and
   the second average pore size is 1 nm or more and 500 nm or less.

2. The device according to claim 1, wherein
   the cathode is provided on the second porous surface.

3. The device according to claim 1, further comprising
   a cathode solution flow path configured to supply a cathode solution to the cathode.

4. The device according to claim 3, wherein
   the cathode has a first surface facing on the gas flow path and a second surface facing on the cathode solution flow path; and
   the cathode solution flow path is provided between the diaphragm and the cathode such that the cathode solution is in contact with the second porous surface and the cathode.

5. The device according to claim 3, wherein
   the cathode solution contains at least one ion selected from the group consisting of a phosphate ion, a borate ion, a sodium ion, a potassium ion, a calcium ion, a lithium ion, a cesium ion, a magnesium ion, a chloride ion, a hydrogen carbonate ion, and a carbonate ion.

6. The device according to claim 1, wherein
   the anode solution contains at least one ion selected from the group consisting of a phosphate ion, a borate ion, a sodium ion, a potassium ion, a calcium ion, a lithium ion, a cesium ion, a magnesium ion, a chloride ion, a hydrogen carbonate ion, and a carbonate ion.

7. The device according to claim 1, wherein
a thickness of the diaphragm is 5 µm or more and 500 µm or less.

8. The device according to claim 1, wherein
the porous film contains at least one material selected from the group consisting of a metal oxide, a metal hydroxide, a metal nitrate, a metal sulfate, ceramics, glass, polytetrafluoroethylene, polychlorotrifluoroethylene, polyetheretherketone, polyethylene, polyethylene terephthalate, polybutylene terephthalate, cellulose acetate, nitrocellulose, polyphenylsulfone, polyphenylene sulfide, polysulfone, polyethersulfone, polyacrylonitrile, polyetherimide, polyamideimide, polyvinylidene fluoride, polycarbonate, polyester, polybenzimidazole, polyarylate, acrylic, nylon, polyolefin, polyurethane, polypropylene, and polystyrene.

9. The device according to claim 1, wherein
the gas flow path is controlled to be under a positive pressure relative to the anode solution flow path, and
a pressure difference between the gas flow path and the anode solution flow path is 5 kPa or more and 800 kPa or less.

10. The device according to claim 1, wherein
the cathode has an electrode substrate, a metal catalyst supported on a carbon material, and an ion-conductive material.

11. The device according to claim 10, wherein
the metal catalyst contains at least one metal selected from the group consisting of gold, silver, copper, platinum, palladium, nickel, cobalt, iron, manganese, titanium, cadmium, zinc, indium, gallium, lead, and tin, or a metal oxide thereof, and
the metal catalyst has at least one structure selected from the group consisting of a nanoparticle, a nanostructure, and a nanowire.

12. The device according to claim 1, further comprising
a power supply configured to supply an electric current between the anode and the cathode.

13. The device according to claim 1, wherein
a thickness of the diaphragm is 20 µm or more and 300 µm or less.

\* \* \* \* \*